(12) United States Patent
Kim et al.

(10) Patent No.: US 9,359,800 B2
(45) Date of Patent: Jun. 7, 2016

(54) HOOD OPENING AND CLOSING DEVICE FOR ZERO TAIL TYPE CONSTRUCTION MACHINERY

(71) Applicant: VOLVO CONSTRUCTION EQUIPMENT AB, Eskilstuna (SE)

(72) Inventors: Seok-Won Kim, Busan (KR); Taek-Woo Lee, Gimhae-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/435,011

(22) PCT Filed: Oct. 25, 2012

(86) PCT No.: PCT/KR2012/008802
§ 371 (c)(1),
(2) Date: Apr. 10, 2015

(87) PCT Pub. No.: WO2014/065450
PCT Pub. Date: May 1, 2014

(65) Prior Publication Data
US 2015/0259961 A1    Sep. 17, 2015

(51) Int. Cl.
*E05D 7/02* (2006.01)
*E02F 9/08* (2006.01)
(Continued)

(52) U.S. Cl.
CPC *E05D 7/02* (2013.01); *B62D 33/00* (2013.01); *E02F 9/0891* (2013.01); *E05B 79/22* (2013.01);
(Continued)

(58) Field of Classification Search
CPC .............. E05D 7/02; E05C 3/12; E06B 3/36; E05F 15/33; B62D 33/00; E05B 79/22; E05B 85/243; E02F 9/0891
USPC .......................................................... 49/382
See application file for complete search history.

(56) References Cited

U.S. PATENT DOCUMENTS 3,398,674 A * 8/1968 Venable ............................. 100/1
5,704,167 A * 1/1998 Swinderman ................... 49/381
(Continued)

FOREIGN PATENT DOCUMENTS

EP    2913442 A1    9/2015
FR    2698906 A1 *  6/1994  ................ E05D 7/02
(Continued)

OTHER PUBLICATIONS

International Search Report (in Korean and English) and Written Opinion (in Korean) for PCT/KR2012/008802, mailed Apr. 15, 2013; ISA/KR.
(Continued)

*Primary Examiner* — Jerry Redman
(74) *Attorney, Agent, or Firm* — Harness, Dickey & Pierce, P.L.C.

(57) ABSTRACT

The present invention relates to a hood opening and closing device for zero tail type construction machinery that is used to open and close a swing type hood, at which a hinge portion is mounted on a fuel tank in a left-right direction. The hood opening and closing device for zero tail type construction machinery according to the present invention includes: a first sheet that is mounted on an outer side surface of a fuel tank; a pivot plate that is pivotally fixed to the hinge portion which is mounted on the first sheet; the swing type hood that is connected to an upper end of the pivot plate and is opened and closed in the left-right direction through a circular movement about the hinge portion; a second sheet that is mounted on an upper surface of the fuel tank; and a gas spring which has one end fixed to the second sheet and the other end fixed to a bottom surface of the swing type hood and supports, opens, and closes the swing type hood.

3 Claims, 5 Drawing Sheets

(51) Int. Cl.
  *E05B 79/22* (2014.01)
  *E05B 85/24* (2014.01)
  *B62D 33/00* (2006.01)
  *E05C 3/12* (2006.01)
  *E06B 3/36* (2006.01)
  *E05B 79/20* (2014.01)

(52) U.S. Cl.
  CPC ............. *E05B 85/245* (2013.01); *E05C 3/12* (2013.01); *E06B 3/36* (2013.01); *E05B 79/20* (2013.01); *E05D 2700/02* (2013.01)

(56) References Cited

U.S. PATENT DOCUMENTS

| | | | |
|---|---|---|---|
| 5,715,615 A | 2/1998 | Murakami et al. | |
| 7,914,067 B2 | 3/2011 | Lee | |
| 8,453,304 B2* | 6/2013 | Kunz | 29/33 R |
| 8,474,562 B2* | 7/2013 | Elhardt et al. | 180/89.12 |
| 8,499,871 B2* | 8/2013 | Renard et al. | 180/69.2 |
| 2007/0063540 A1* | 3/2007 | Browne et al. | 296/180 |
| 2009/0133297 A1 | 5/2009 | Lee | |
| 2009/0236876 A1* | 9/2009 | Sawai et al. | 296/193.11 |
| 2011/0180344 A1* | 7/2011 | Kimura | 180/309 |
| 2014/0238760 A1* | 8/2014 | Noda | 180/69.24 |
| 2014/0252785 A1 | 9/2014 | Kim | |
| 2015/0259961 A1 | 9/2015 | Kim et al. | |

FOREIGN PATENT DOCUMENTS

| | | |
|---|---|---|
| JP | 05-089166 U | 12/1993 |
| JP | 2000-291058 A | 10/2000 |
| KR | 10-2009-0055192 A | 6/2009 |
| KR | 10-2012-0063134 A | 6/2012 |
| WO | WO-2014-065450 A1 | 5/2014 |

OTHER PUBLICATIONS

Office Action and Examination Search Report issued by the Canadian Intellectual Property Office (CIPO) on Mar. 3, 2016 regarding corresponding Canadian Application No. 2,888,142 (5 pages).

* cited by examiner

HOOD OPENING AND CLOSING DEVICE FOR ZERO TAIL TYPE CONSTRUCTION MACHINERY

TECHNICAL FIELD

The present invention relates to a hood opening and closing apparatus for a small swing radius construction machine. More particularly, the present invention relates to such a hood opening and closing apparatus for a small swing radius construction machine, which enables a swing hood to be opened in left and right directions by means of a hinge portion fixed to a fuel tank.

BACKGROUND OF THE INVENTION

In general, a small swing radius construction machine has been developed such that an operator can perform a work while maintaining the radius of gyration of an operator's cab or a swing structure small. The small swing radius construction machine is configured to have an arc shape in which an outer wall or a door of the operator's cab is curved outwardly. The door of the operator's cab is opened and closed in a sliding manner while forming a constant radius on the outer wall of the operator's cab.

A hood of a fuel tank for an engine installed on the small swing radius construction machine can be opened from the front to the rear of the construction machine by means of a hinge portion fixed to the rear surface of the fuel tank. As a result, in the case where fuel is injected into the fuel tank or a filter or the like is inspected and replaced with a new one, it is not easy for an operator to access the fuel tank due to the hood opened toward the operator. Thus, the operator suffers from an inconvenience of having to climb a track from a side of the construction machine to inspect the filter or the like.

Meanwhile, another hood of a fuel tank for an engine installed on the small swing radius construction machine can be opened from the rear to the front of the construction machine by means of a hinge portion fixed to the top surface of the fuel tank. In this case, when the hood is opened at a maximum angle, an interference occurs between the hood and the operator's cab. This makes it difficult for the operator to access the fuel tank during the post-maintenance operation such as the replacement of the filter of the fuel tank in a state in which the hood is opened at a maximum angle of approximately 60°.

SUMMARY OF THE INVENTION

Accordingly, the present invention has been made to solve the aforementioned problems occurring in the prior art, and it is an object of the present invention to provide a hood opening and closing apparatus for a small swing radius construction machine, which enables a swing hood to be opened in left and right directions by means of a hinge portion fixed to a fuel tank so that an operator can easily access the fuel tank or the like.

Another object of the present invention is to provide a hood opening and closing apparatus for a small swing radius construction machine, in which seats are weldingly fixed to a fuel tank and a hood, and then a gas spring and a hinge portion are fixedly fastened to the seats by means of bolts so that the strength of the hood or the like can be reinforced.

Technical Solution

To achieve the above object, in accordance with an embodiment of the present invention, there is provided a hood opening and closing apparatus for a small swing radius construction machine, the apparatus including:

a first seat installed on an outer surface of a fuel tank;

a rotary plate rotatably fixed to a hinge portion installed on the first seat;

a swing hood connected to an upper end of the rotary plate and configured to perform a circular motion around the hinge portion so as to be opened and closed in left and right directions;

a second seat installed on a top surface of the fuel tank; and a gas spring fixed at one end thereof to the second seat and fixed at the other end thereof to an underside of the swing hood, the gas spring being configured to openably and closeably support the swing hood.

In a preferred embodiment of the present invention, the hood opening and closing apparatus may further include a strength reinforcement plate which is installed on the underside of the swing hood and to which the other end of the gas spring is fixed.

The hinge portion may be securely fixed to the first seat by means of a bolt, and the gas spring may be fixed at the one end thereof to the second seat by means of a bolt.

The hood opening and closing apparatus may further include a locking device for opening and closing the swing hood, wherein the locking device includes:

a latch knob unit installed on one side of the swing hood and having an inner side to which one end of a wire cable is connected;

a latch unit including a latch bracket installed on the fuel tank or a counterweight and a striker installed on the latch bracket; and a catch unit including first and second catch brackets installed on an inner side of the swing hood to face each other, a lock guard rotatably installed between the first and second catch brackets and so as to be locked on or unlocked from the striker depending on the opening and closing of the swing hood, a catch lever rotatably installed on an outer surface of the second catch bracket and connected to the other end of the wire cable, a locker operated in cooperation with the rotation of the catch lever to cause the lock guard to be unlocked from the striker when the locked state of the locker is released, and an elastic member provided on the wire cable and configured to elastically support an initial locking state in which the lock guard is locked on the striker by pressing the catch lever.

Advantageous Effect

The hood opening and closing apparatus for a small swing radius construction machine in accordance with an embodiment of the present invention as constructed above has the following advantages.

The swing hood is opened and closed in left and right directions by means of a hinge portion securely fixed to the fuel tank so that an operator can easily access the fuel tank or the like so as to replace a filter or the like with a new one, thereby ensuring convenience.

The seats are weldingly fixed to the fuel tank and the hood, and then the gas spring and the hinge portion are fixedly fastened to the seats by means of bolts so that the strength of the hood or the like can be reinforced.

BRIEF DESCRIPTION OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

Figure 1:
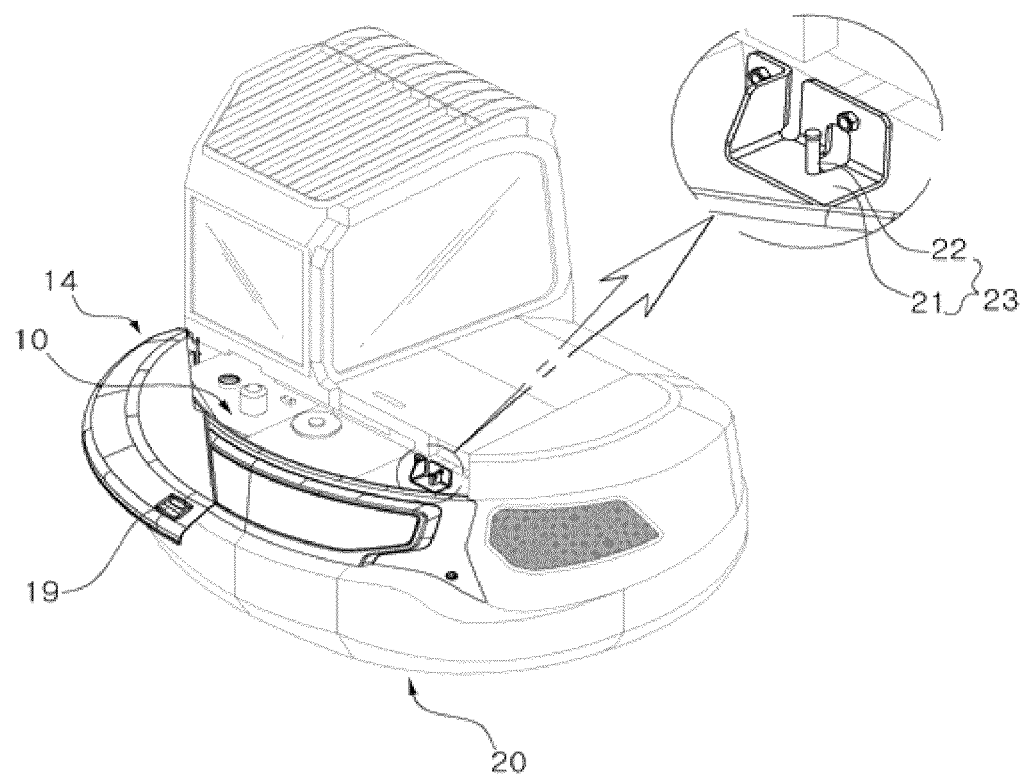
FIG. 1 is a perspective view showing the installation of a swing hood in a hood opening and closing apparatus for a small swing radius construction machine in accordance with an embodiment of the present invention.

4: hood
10: fuel tank
11: first seat
12: hinge portion
13: rotary plate
14: swing hood
15: second seat
16: gas spring
17: strength reinforcement plate
18: wire cable
19: latch knob unit
20: counterweight
21: latch bracket
22: striker
23: latch unit
24: first catch bracket
25: second catch bracket
26: lock guard
27: catch lever
28: elastic member
29: catch unit

DETAILED DESCRIPTION OF THE INVENTION

Now, a swing control apparatus for construction machine in accordance with preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 2:
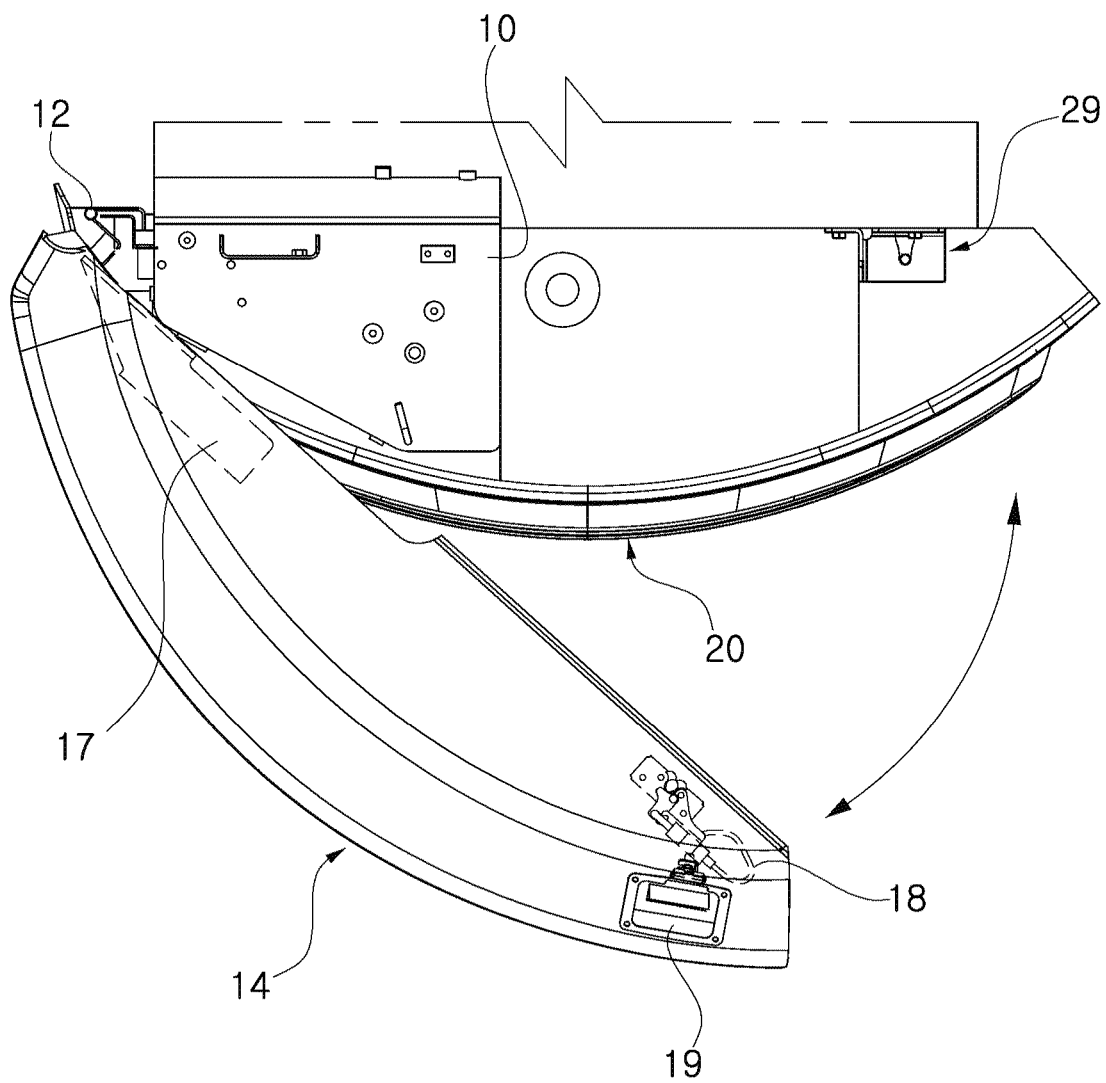
FIG. 2 is a top plan view showing the opening and closing of a swing hood in a hood opening and closing apparatus for a small swing radius construction machine in accordance with an embodiment of the present invention.
Figure 3:
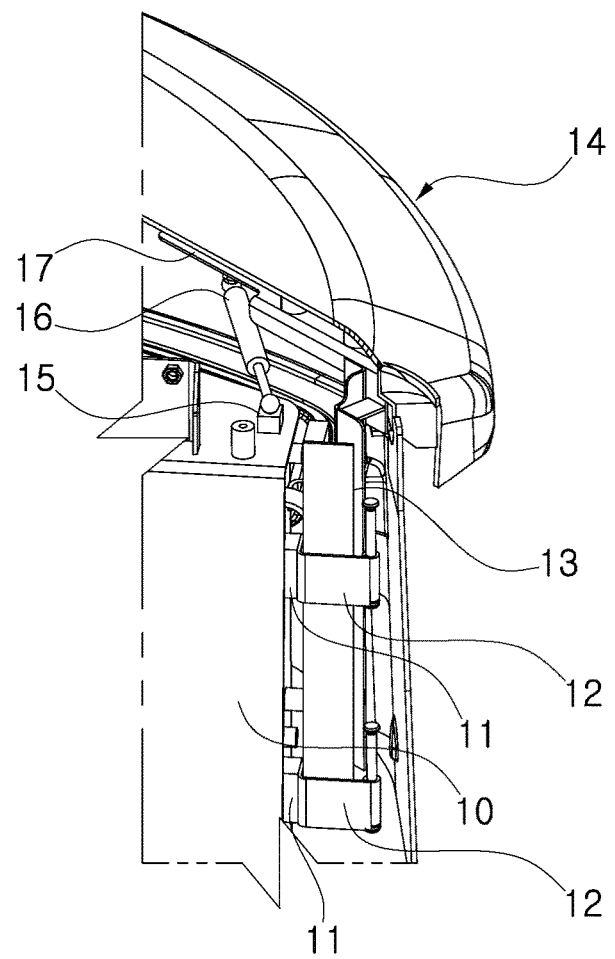
FIG. 3 is a schematic view showing main elements of a hinge portion as shown in FIG. 2 in a hood opening and closing apparatus for a small swing radius construction machine in accordance with an embodiment of the present invention.
Figure 4A:
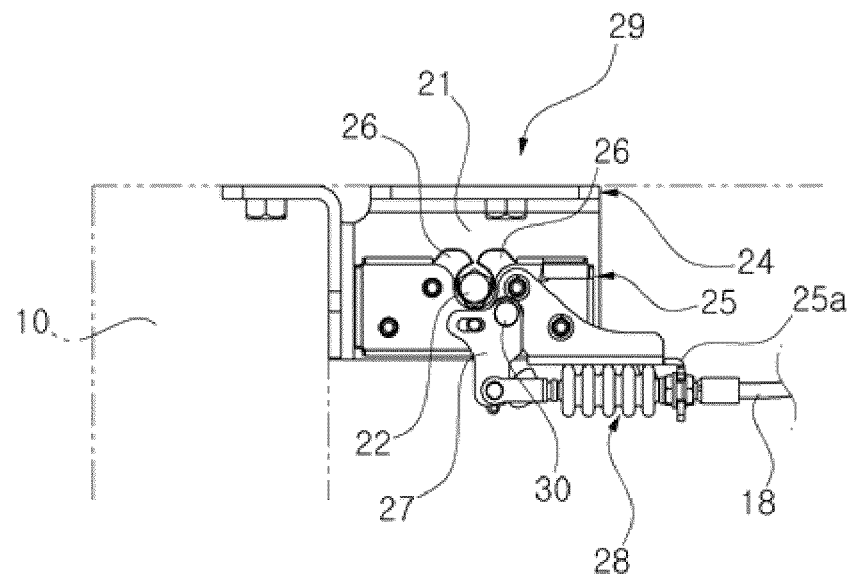
FIGS. 4(a) and 4(b) are schematic views showing the locking and unlocking operations of a swing hood in a hood opening and closing apparatus for a small swing radius construction machine in accordance with an embodiment of the present invention.
Figure 4B:
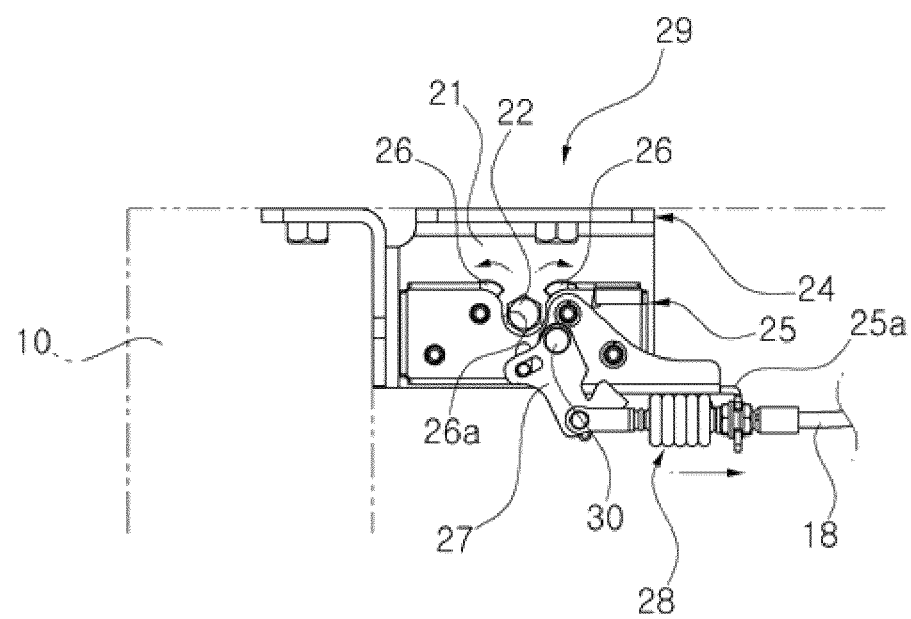
Figure 5:
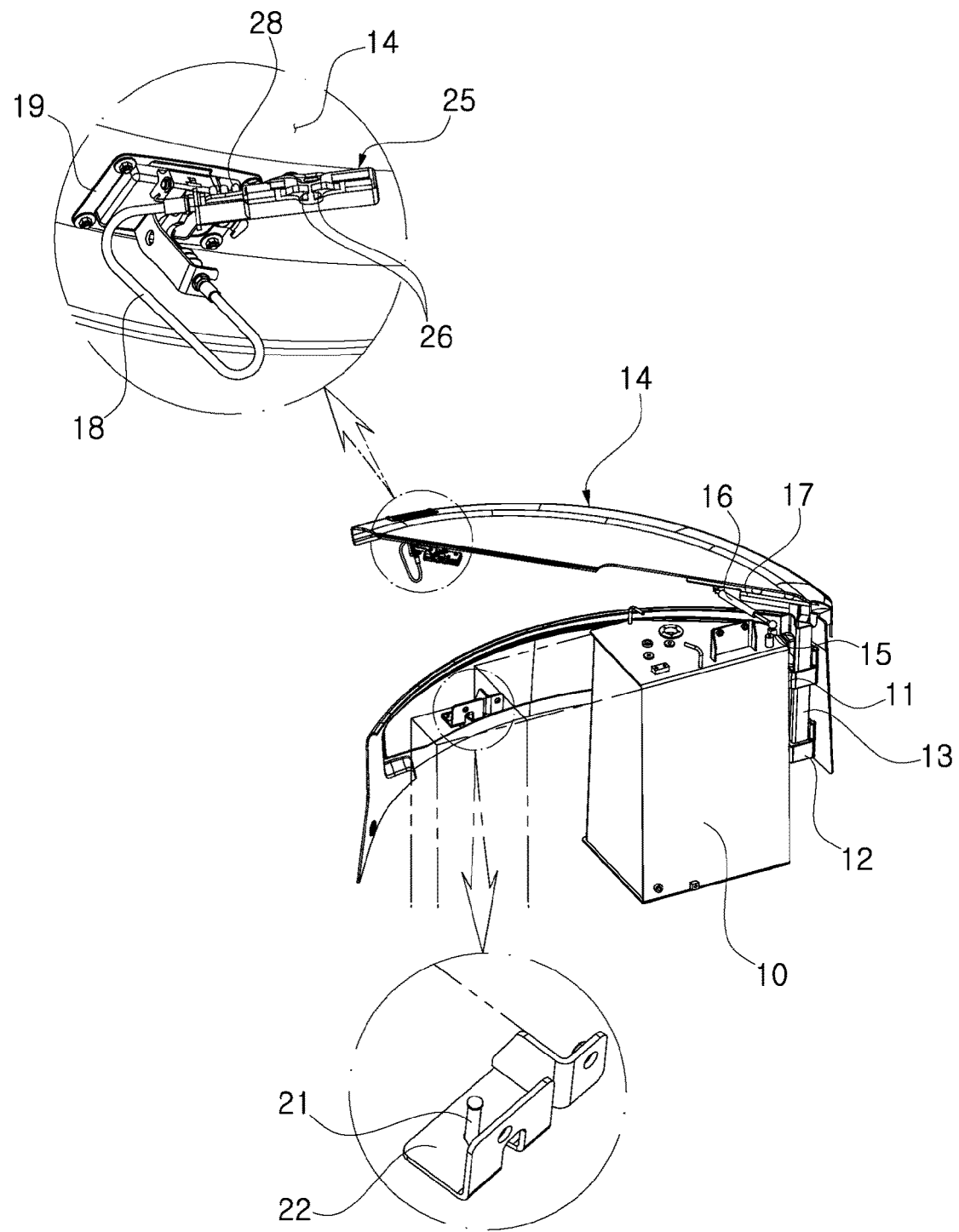
FIG. 5 shows the opening and closing of a swing hood and a locking means in a hood opening and closing apparatus for a small swing radius construction machine in accordance with an embodiment of the present invention.

FIG. 1 is a perspective view showing the installation of a swing hood in a hood opening and closing apparatus for a small swing radius construction machine in accordance with an embodiment of the present invention, FIG. 2 is a top plan view showing the opening and closing of the swing hood shown in FIG. 1, FIG. 3 is a schematic view showing main elements of a hinge portion as shown in FIG. 2, FIGS. 4(a) and 4(b) are schematic views showing the locking and unlocking operations of the swing hood shown in FIG. 1, and FIG. 5 shows the opening and closing of a swing hood and a locking means in a hood opening and closing apparatus for a small swing radius construction machine in accordance with an embodiment of the present invention.

Referring to FIGS. 1 to 5, in accordance with an embodiment of the present invention, in a small swing radius construction machine including an upper swing structure mounted on an lower traveling structure, an attachment mounted to the upper swing structure, an operator's cab, a fuel tank for an engine, and a counterweight, a hood opening and closing apparatus for the construction machine includes:

a first seat 11 that is installed on an outer surface of the fuel tank 10;

a rotary plate 13 that is rotatably fixed to a hinge portion 12 installed on the first seat 11;

a swing hood 14 that is connected to an upper end of the rotary plate 13 and is configured to perform a circular motion around the hinge portion 12 so as to be opened and closed in left and right directions;

a second seat 15 that is installed on a top surface of the fuel tank 10; and a gas spring 16 that is fixed at one end thereof to the second seat 15 and is fixed at the other end thereof to an underside of the swing hood 14, the gas spring being configured to openably and closeably support the swing hood 14.

The hood opening and closing apparatus may further include a strength reinforcement plate 17 which is installed on the underside of the swing hood 14 and to which the other end of the gas spring 16 is fixed.

The hinge portion 12 is securely fixed to the first seat 11 by means of a bolt, and the gas spring 16 is fixed at the one end thereof to the second seat 15 by means of a bolt.

The hood opening and closing apparatus further includes a locking device for opening and closing the swing hood 14, wherein the locking device includes:

a latch knob unit 19 installed on one side of the swing hood 14 and having an inner side to which one end of a wire cable 18 is connected;

a latch unit 23 including a latch bracket 21 installed on the fuel tank 10 or a counterweight 20 and a striker 22 installed on the latch bracket 21; and a catch unit 29 including first and second catch brackets 24 and 25 installed on an inner side of the swing hood 14 to face each other, a lock guard (26) rotatably installed between the first and second catch brackets 24 and 25 so as to be locked on or unlocked from the striker 22 depending on the opening and closing of the swing hood 14, a catch lever 27 rotatably installed on an outer surface of the second catch bracket 25 and connected to the other end of the wire cable 18, a locker (not shown) operated in cooperation with the rotation of the catch lever 27 to cause the lock guard 26 to be unlocked from the striker 22 when the locked state of the locker is released, and an elastic member 28 (e.g., a compression coil spring) provided on the wire cable 18 and configured to elastically support an initial locking state in which the lock guard 26 is locked on the striker 22 by pressing the catch lever 27.

In the drawings, a non-explained reference numeral 25a denotes a fixing piece that extends to the second catch bracket 25 and supports the elastic member 28 so that an elastic force of the elastic member 28 provided at one end of the wire cable 18 is transferred to the catch lever 27 side to maintain a state in which the lock guard 26 is locked on the striker 22.

In accordance with the construction as described above, in the case where fuel is replenished in the fuel tank 10 for an engine, which is installed on the upper swing structure, or a filter is inspected and replaced with a new one, the swing hood 14 is opened as shown in FIG. 1. In other words, when the latch knob unit 19 installed on one side of the swing hood 14 is pulled by a user toward the user, the elastic member 28 provided at one end of the wire cable 18 receives a compressive force and the catch lever 27 connected to one end of the wire cable 18 is rotated in a counterclockwise direction about a fixed pin as shown in FIG. 4b.

The rotation of the catch lever 27 releases the locked state of the locker (not shown) constituting the catch unit 29. In this case, since the lock guard 26 is unlocked from the striker 22 so as to be converted into an unlocked state, the locked state of the catch unit 29 to the latch unit 23 is released. Meanwhile, in the case where an external force from the striker 22 installed on the upper swing structure is not applied to the inner periphery 26a of the lock guard 26, the lock guard 26 is maintained in a state of being unlocked from the striker 22.

Thus, the gas spring 16 mounted at one end thereof to the swing hood 14 is driven to extend to cause the swing hood 14 to perform a circular motion in a clockwise direction around the hinge portion 12. As a result, the swing hood 14 is swung from the right to the left on the drawing sheet so that the swing hood 14 can be opened as shown in FIGS. 1 and 2. On the other hand, in the case where the external force applied to the latch knob unit 19 when pulling the latch knob unit 19 is removed, the catch lever 27 is pushed by an elastic restoring force of the elastic member 28 to cause the catch lever 27 to be rotated about the fixed pin 30 in a clockwise direction on the drawing sheet.

Meanwhile, when the user presses the periphery of the latch knob unit 19 to push the latch knob unit 19 to the upper swing structure so as to close the swing hood 14, the gas spring 16 is driven to retract. In this case, since the external force from the striker 22 installed on the upper swing structure is pressingly applied to the inner periphery 26a of the lock guard 26, the lock guard 26 maintained in a state of being unlocked from the striker 22 is converted into a locked state of being locked on the striker 22. At this time, since the catch lever 27 is pressed by the elastic force of the elastic member 28 provided on one end of the wire cable 18, the locker converted into a locked state can maintain a locked state of the lock guard 26 to the striker 22 as shown in FIG. 4a.

As described above, the hood opening and closing apparatus for a small swing radius construction machine enables the swing hood 14 to perform a circular motion around the hinge portion 12 so as to be opened in a swing manner. Resultantly, in the case where the swing hood 14 is opened to replenish fuel in the fuel tank 10 or inspect a filter or the like, no interference occurs owing to the swing hood 14 opened. Thus, an operator easily accesses the swing hood 14, thereby ensuring workability and convenience.

INDUSTRIAL APPLICABILITY

In accordance with the hood opening and closing apparatus for a small swing radius construction machine of the present invention as constructed above, the swing hood is opened in left and right directions by means of the hinge portion fixed to the fuel tank of the small swing radius construction machine so that the operator can easily access the fuel tank or the like.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

The invention claimed is:

1. A hood opening and closing apparatus for a construction machine of a type having a swing radius at the rear, the apparatus comprising:
   a first seat installed on an outer surface of a fuel tank;
   a rotary plate rotatably mounted to a hinge portion installed on the first seat;
   a swing hood connected to an upper end of the rotary plate and configured to perform a circular motion around the hinge portion so as to be opened and closed in left and right directions;
   a second seat installed on a top surface of the fuel tank;
   a gas spring fixed at a first end thereof to the second seat and fixed at a second end thereof to an underside of the swing hood, the gas spring being configured to openably and closeably support the swing hood; and
   a locking device for opening and closing the swing hood;
   wherein the locking device includes:
   a latch knob unit installed on one side of the swing hood and having an inner side to which one end of a wire cable is connected;
   a latch unit including a latch bracket installed on the fuel tank or a counterweight and a striker installed on the latch bracket; and
   a catch unit including first and second catch brackets installed on an inner side of the swing hood to face each other, a lock guard rotatably installed between the first and second catch brackets so as to be locked on or unlocked from the striker depending on the opening and closing of the swing hood, a catch lever rotatably installed on an outer surface of the second catch bracket and connected to the other end of the wire cable, a locker operated in cooperation with a rotation of the catch lever to cause the lock guard to be unlocked from the striker when the locked state of the locker is released, and an elastic member provided on the wire cable and configured to elastically support an initial locking state in which the lock guard is locked on the striker by pressing the catch lever.

2. The hood opening and closing apparatus according to claim 1, further comprising a strength reinforcement plate which is installed on the underside of the swing hood and to which the second end of the gas spring is fixed.

3. The hood opening and closing apparatus according to claim 1, wherein the hinge portion is securely fixed to the first seat by means of a bolt, and the gas spring is fixed at the one end thereof to the second seat by means of a bolt.

* * * * *